United States Patent [19]

Recktenwald

[11] 3,822,824

[45] July 9, 1974

[54] CONTROL VALVE FOR A CATALYTIC HEATER

[76] Inventor: James N. Recktenwald, 10011 Greenfern Cir., Westminster, Calif. 92683

[22] Filed: Jan. 8, 1973

[21] Appl. No.: 321,871

[52] U.S. Cl.................... 236/102, 236/96, 431/81
[51] Int. Cl............................................. F23n 5/04
[58] Field of Search........... 236/102, 96, 5; 431/77, 431/81

[56] References Cited
UNITED STATES PATENTS

| 631,811 | 8/1899 | Phelps | 431/77 |
|---|---|---|---|
| 898,634 | 9/1908 | Eisenhauer | 431/77 X |
| 3,037,554 | 6/1962 | Risse | 431/77 |

Primary Examiner—William E. Wayner
Attorney, Agent, or Firm—Dominick Nardelli

[57] ABSTRACT

A control valve for a catalytic heater, having a gas inlet and a gas outlet that are connected by two parallel passageways. In one passageway is disposed a thermally activated valve that keeps one passageway open as long as the heater is at an elevated temperature. To start the heater a spring-loaded manual valve is disposed in the other passageway so that when one senses the formation of heat, he releases the manual valve to close the respective passageway, since gas is being supplied to the heater through the first mentioned passageway. In addition means are provided to control the maximum gas flow rate.

1 Claim, 2 Drawing Figures

PATENTED JUL 9 1974   3,822,824

3,822,824

CONTROL VALVE FOR A CATALYTIC HEATER

FIELD OF THE INVENTION

This invention relates to heater valves and, more particularly, to catalytic heater valves that automatically shut off the supply of combustible gases whenever the temperature of the heater drops below a threshold value.

BACKGROUND OF THE INVENTION

Catalytic heaters are well-known in the art and could be described as heaters that oxydize combustible hydrocarbons without production of a flame. Therefore the surface temperature of the heater is substantially lower than in a flame-type heater, and, in addition, being a very efficient heater. Since there is no flame present and the temperature is maintained below kindling temperature of most combustible materials, these heaters are considered safe. However, if the temperature of the heaters should drop, for any reason, the fuel supply must be shut off since harmful combustible gases would be liberated. Up to now, the safety means for turning off the gas supply has been relatively complicated and expensive.

OBJECTS OF THE INVENTION

An object is to provide a simple, economical control valve that stops, automatically, the flow of gas to a heater whenever the temperature of the heater drops below a given threshold value.

Another object is to provide a control valve that stops the flow of gas to a heater that is mechanically responsive to temperature.

These and other objects and features of advantage will become more apparent after studying the following description of the preferred embodiment of the invention, together with the appended drawings.

DETAILED DESCRIPTION OF THE DRAWINGS

Figure 1:
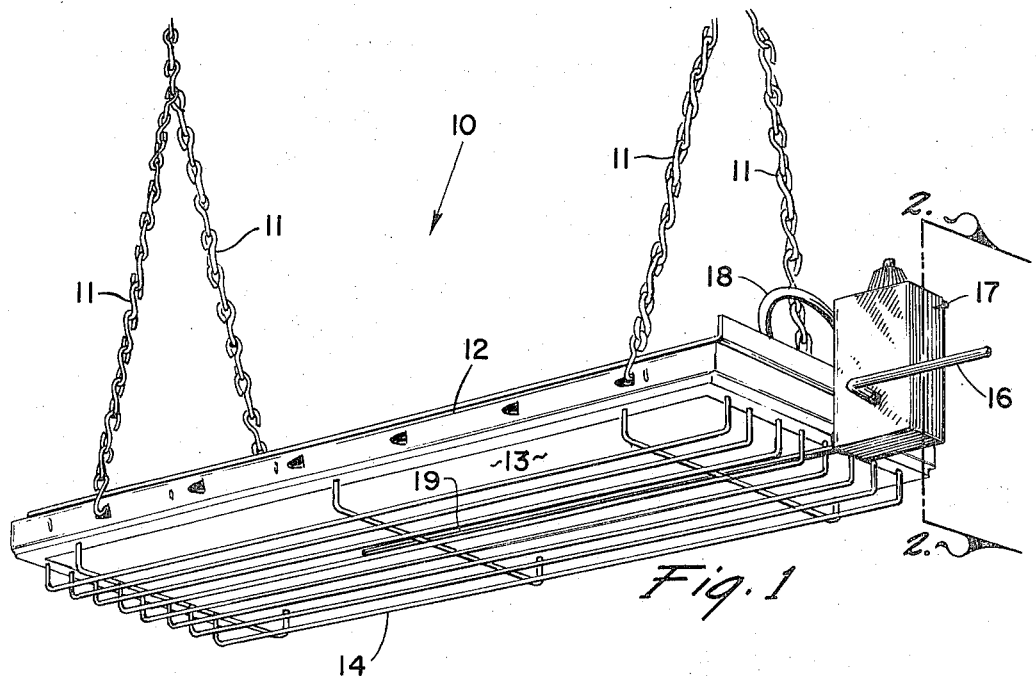
FIG. 1 is a pictorial view of a typical catalytic heater employing my novel valve.

FIG. 1 shows a heater assembly 10, hanging by chains 11 from an overhead (not shown). The heater assembly has a suitable frame 12 that supports a standard type catalytic bed 13 that oxydizes any hydrocarbon or combustible gas that comes in contact therewith, without the production of a flame. As in standard type catalytic heaters, the temperature developed on the surface of the catalytic bed is in the neighborhood of 100° F; but substantially below flame or kindling temperature of the combustible gases. A safety grill 14 encloses the catalytic bed 13. The combustible gases are fed to the heater by a tube 16 through my novel valve 17, then through another tube 18, and to the catalytic bed 13, where the gas is oxydized. As mentioned above, since the catalytic action only takes place above a threshold temperature, for example, 100° a temperature sensing means 19 is disposed in front of the catalytic bed so that the heat generated is radiated towards the means 19. The function of the means 19 is to stop the flow of gas whenever the temperature of the catalytic bed falls below the threshold value. This insures that toxic and combustible gases are not liberated within a substantially closed room.

Figure 2:
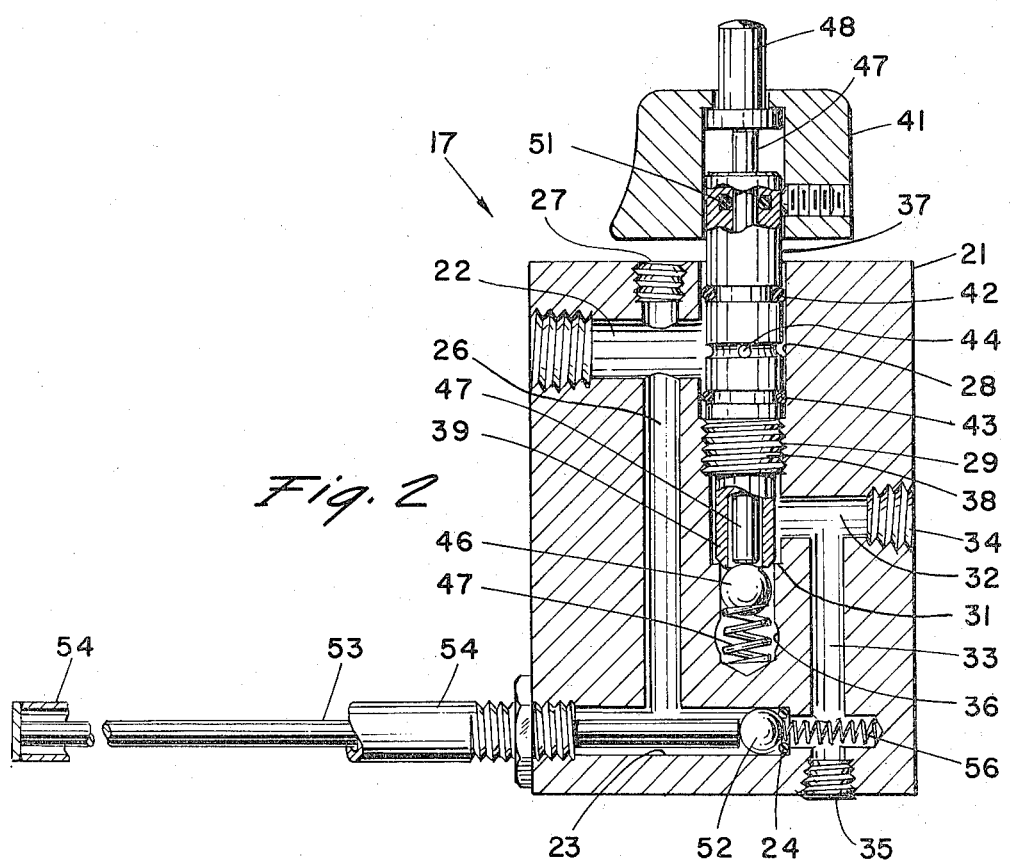
FIG. 2 is a sectional view of the valve taken on line 2—2 of FIG. 1 in the direction of the arrows.

Referring to FIG. 2, the manner in which my novel valve stops the gas flow will now be described. The valve 17 is made of a rectangular block 21 of metal, for example, brass or aluminum. The block is made compact and economical and has the dimensions of, for example, 2¾ by 2 by 1 inches. The block has a plurality of drilled holes or bores that connect with each other. In the preferred embodiment an outlet bore 22 is drilled from one side, and from the same side another bore 23 is drilled and this bore 23 has a shoulder 24 formed therein for reasons that will be described hereinafter. The internal end of bore 23 is of a smaller diameter than the exterior end, and also terminates within the block 21. At right angles to bores 22 and 23 is drilled another bore 26 that communicates with both bores 22 and 23. As shown, the external end of bore 26 is threaded and a suitable plug 27 is threaded therein. Spaced from bore 22 and normal thereto is another bore 28 that communicates with bore 22. On the opposite side of bore 22 from the open end of bore 28 are formed within bore 28 screw threads 29 so that the portion of the bore interior of the threads is inherently of smaller diameter than the portion exterior of the threads 29. Bore 28 also has a shoulder 31 and also terminates within the block 21. Two more bores, 32 and 33, are drilled, as shown, and each has a threaded end with suitable plugs 34 and 35 threaded in the end of bores 32 and 33, respectively. An inlet bore 36 is drilled from one side of block 21 and normal to the drawing to communicate with bore 28, as shown. Within bore 28 is disposed a tubular sleeve 37, having a threaded portion 38, that engages threads 29, and a tip 39 that seals against shoulders 31 when the sleeve is screwed tightly down. A knob 41 is used to pursue in turning the sleeve 37. Around the sleeve 37 are two sealing O-rings 42 and 43, disposed on each side of inlet bore 22. The sleeve 37 has at least one radial hole 44, as shown, to allow gas to flow therethrough. Against the tip 39 is biased a ball 46 by a spring 47 to seal the opening thereof. Slidably disposed within and spaced from the sleeve 37 is a rod 47 that contacts the ball 46 by its inward end. The external end engages a button 48 so that by one pushing down on the button causes the ball 46 to move away from the tip 39. Another sealing O-ring is provided to prevent gas leaks.

Within the bore 23 is disposed another sealing ball 52 that, at ambient temperatures of, for example 70° F, is held against the shoulder 42 by a rod 53 enclosed by a closed end tube 54 that is in turn threaded by its open end into the bore 23. The ball 52 is biased away from the shoulder by a suitable spring 56. By choosing the proper materials for the rod 53 and the tube 54, the preferred embodiment of the temperature sensor means 19 is formed. In this embodiment, by making the rod 53, for example, of steel, and the tube 54, for example, of aluminum, wherein the rod inherently has a lower coefficient of thermal expansion than the tube, then at elevated temperatures, the rod 53 will shorten relative to the tube 54 to allow the spring 56 to lift the ball 52 off the shoulder 24 to allow gas to pass. Now, since the rod 53 makes contact with the closed end of tube 54, then at ambient temperature, which is lower than operating temperature, the rod 53 will elongate relative to the tube and will be urged by the tube against the ball 52, compressing the spring 56 and, in essence, seal the passageway.

My new novel valve operates in the following manner:

To start the catalytic heater, hydrocarbon gases need only come in contact with the catalytic bed 13. Since the system is at ambient temperature, or lower, rod 53 urges the ball 52 against the shoulder 24 and spring 47 urges ball 46 against tip 39. Therefore, gas cannot pass from the inlet bore 36 to the outlet bore 22 by bores 28, 32, 33, 23, 26 and 22. To start, knob 41 is twisted about one-half turn or so to move the tip 39 away from the shoulder 31. To move the ball 46 away from the tip 39, one, by pressing the button 48, causes the rod 47 to slide axially, to push on the ball 46 and compress the spring 47. The gas is now free to flow up sleeve 37 out of bores 44 into bore 22 and tube 18, to the catalytic bed 13. As the bed heats up, due to the oxydation of the gas, the aluminum tube 54 heats up and expands faster than the steel rod 53 to allow the spring 56 to lift the ball off the shoulder 24. The gas is now free to pass between shoulder 31 and tip 39 through bores 32, 33, 23, 26 and 22 to the bethe bed 13. When this happens, the button 48 is released by the operator and the ball 46 seals against the tip 39. Knob 41 can now be turned to control the maximum flow of gas to the heater. The actual flow of gas is now regulated by the temperature sensor means 19 that operates as follows: The hotter the bed 13 becomes, the more gas is allowed to flow around the ball 52. This excess gas cools the bed since the bed 13 can inherently oxydize no more than a fixed gas flow. When the system cools, the temperature sensor means 19 urges the ball 52 toward the shoulder to slow down the gas flow. Since the gas flow is cut, the bed 13 is not cooled to any extent by the inlet gas, but by radiation and convection only. This elevated temperature allows more gas to be fed to the bed and the cycle repeats itself. If, by chance, the bed 13 becomes too cool to be an effective catalytic heater, the ball 53 seals this passageway and the toxic and combustible gases are prevented from accumulating within any closed room in which the heater is located. During start-up, raw gases could escape into the room; but since a person is operating the valve 17, he is able to take normal precautions against this happening.

Having described the preferred embodiment of the invention, one skilled in the art, after studying the above teachings, could design other embodiments without departing from the scope of the invention. Therefore, the invention is not limited to the described embodiment, but includes all embodiments coming within the scope of the claims.

I claim:

1. A valve for supplying fuel to a heater comprising:

a body having an inlet port and an outlet port and a first and second passageway communicating said ports with each other;

a manual actuated valve disposed in said first passageway;

a thermally actuated valve disposed in said second passageway;

a temperature sensor means attached to said body and disposed to the temperature of said heater;

said temperature sensor means being coupled to said thermally actuated valve to open said valve as the sensed temperature rises and closes said valve as the sensed temperature decreases;

said body having a bore communicating with said inlet port, a sleeve threadably disposed within said bore, said bore having means against which the end of said sleeve may seal when said sleeve is screwed tightly into said bore, a spring biased ball being urged against the end of said sleeve to seal the end of said sleeve, and a rod extenting through said sleeve, contacting said ball at one end and having its other end exposed so that said ball is capable of being urged away from said sleeve by pushing said rod into said body.

* * * * *